(12) United States Patent
Das et al.

(10) Patent No.: US 7,830,834 B2
(45) Date of Patent: Nov. 9, 2010

(54) WIRELESS COMMUNICATION NETWORK INCLUDING NETWORK COORDINATOR ASSIGNING TIME SLOTS AND CHANNELS TO NODES TO PROVIDE COLLISION-FREE SCHEDULES AND DATA AGGREGATION METHOD FOR THE SAME

(75) Inventors: Sujit R. Das, New Berlin, WI (US); Ting Yan, Wauwatosa, WI (US); Luis R. Pereira, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 901 days.

(21) Appl. No.: 11/689,544

(22) Filed: Mar. 22, 2007

(65) Prior Publication Data

US 2008/0232334 A1 Sep. 25, 2008

(51) Int. Cl.
*H04J 3/00* (2006.01)
*H04L 12/28* (2006.01)
*H04L 12/413* (2006.01)

(52) U.S. Cl. .................. 370/329; 370/337; 370/256; 370/445

(58) Field of Classification Search ............. 370/337, 370/321, 347, 254, 329, 351, 356
See application file for complete search history.

(56) References Cited

U.S. PATENT DOCUMENTS

| | | | |
|---|---|---|---|
| 5,737,330 A * | 4/1998 | Fulthorp et al. ............. | 370/346 |
| 7,262,709 B2 * | 8/2007 | Borleske et al. ........ | 340/870.02 |
| 2001/0021650 A1 * | 9/2001 | Bilgic ........................ | 455/418 |
| 2003/0185166 A1 * | 10/2003 | Belcea ....................... | 370/321 |
| 2003/0224787 A1 * | 12/2003 | Gandolfo .................... | 455/434 |
| 2004/0029581 A1 * | 2/2004 | Lu ........................... | 455/426.1 |
| 2005/0135379 A1 * | 6/2005 | Callaway et al. ....... | 370/395.31 |
| 2006/0268792 A1 * | 11/2006 | Belcea ....................... | 370/338 |
| 2007/0032241 A1 * | 2/2007 | Busch et al. ................ | 455/450 |
| 2007/0169080 A1 * | 7/2007 | Friedman .................... | 717/168 |
| 2007/0263592 A1 * | 11/2007 | Agarwal et al. ............. | 370/351 |
| 2009/0310514 A1 * | 12/2009 | Jeon et al. ................... | 370/254 |

OTHER PUBLICATIONS

Maroti, M. et al., "The Flooding Time Synchronization Protocol", ACM SenSys '04, 2004, 11 pp.

* cited by examiner

*Primary Examiner*—Kamran Afshar
*Assistant Examiner*—Munsoon Choo
(74) *Attorney, Agent, or Firm*—Martin J. Moran

(57) ABSTRACT

A wireless communication network includes a network coordinator (NC) having plural channels and plural wireless transceivers, and plural nodes. Each node has status information, a number of channels and a number of wireless transceivers. Each node and the NC communicate in a Carrier Sense Multiple Access mode. Each node communicates the status information thereof to or toward the NC in a Time Division Multiple Access mode having plural time slots. The NC assigns the time slots and the channels to the nodes to provide a plurality of collision-free schedules therefor. The NC sends, for each node, a corresponding one of the collision-free schedules to or toward a corresponding one of the nodes. Each collision-free schedule includes a corresponding number of the time slots and a corresponding number of the channels that the corresponding one of the nodes employs to communicate the status information thereof to or toward the NC.

24 Claims, 8 Drawing Sheets

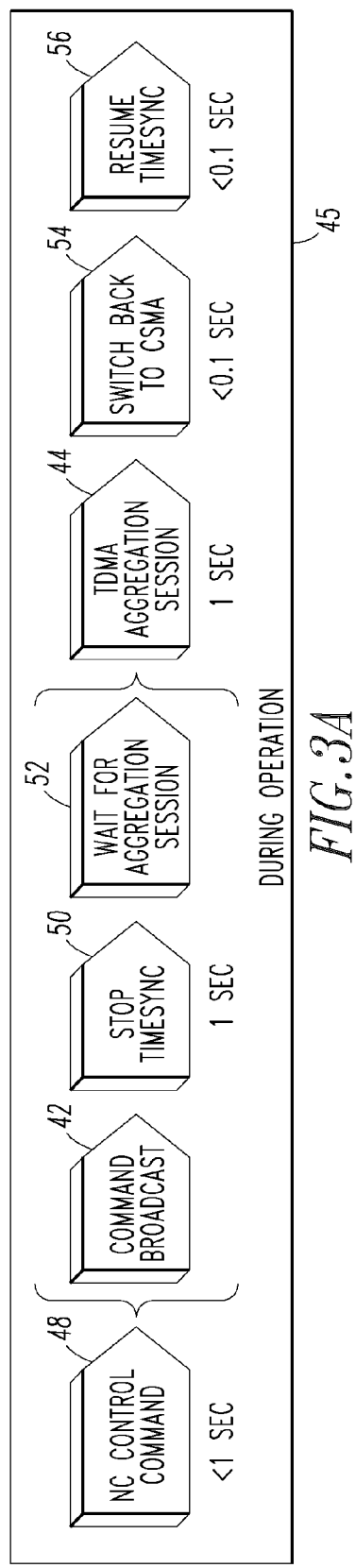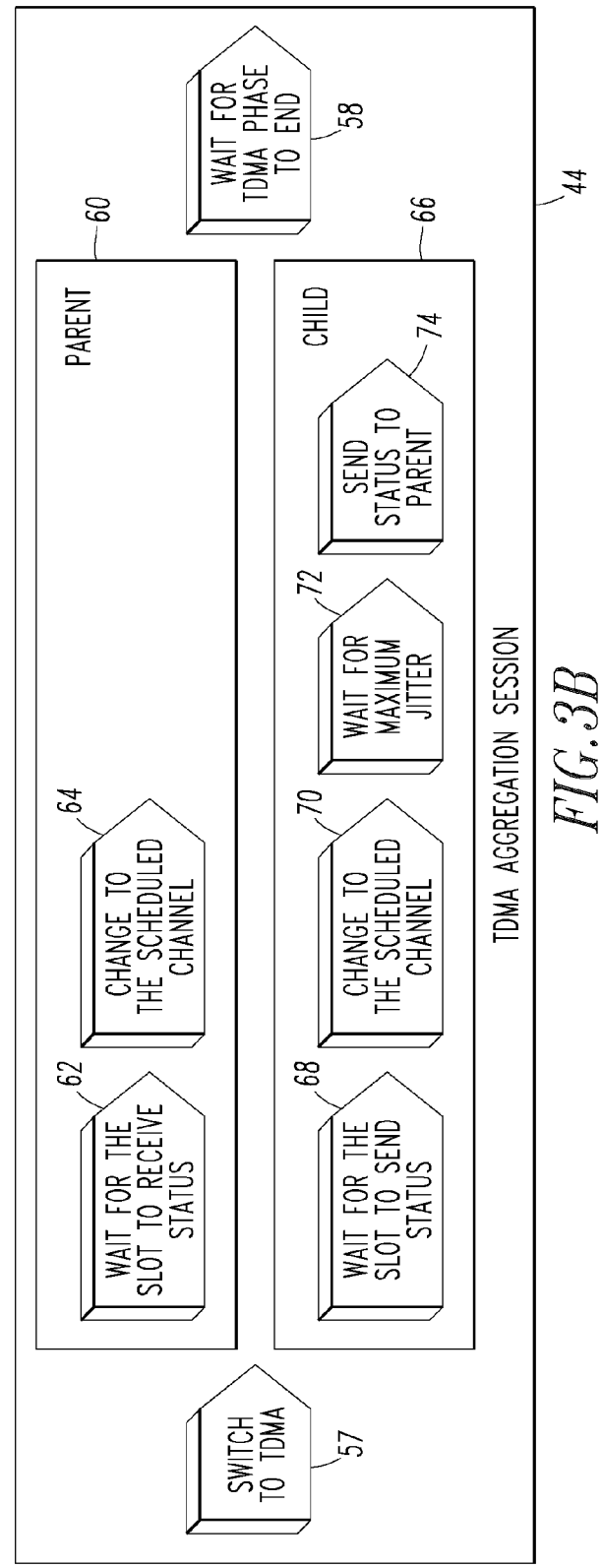

```
visit_node(node)
    parent = getParent(node);
    parentTS = getTS(parent);
    attemptedTS = parentTS++;
    while (attemptedTS <= MAX_TS) {
        scheduled = FALSE;
        for (ch = 0; ch < MAX_CH; ch++) {
            if (occupied(attemptedTS, ch))
                continue;
            needRadio = newRadioNeeded(parent);
            if (!needRadio || radio_available(parent)) {
                schedule(node, attemptedTS, ch);
                scheduled = TRUE;
                if (needRadio) {
                    parent.radio++;
                    totalradio++;
                }
                break; // break out of for
            }
        }
        if (scheduled)
            break; // break out of while
        attemptedTS++; // have to move to the next TS
    }
}
```

| | 30 r 30F | 30 g 30E | 30 b |
|---|---|---|---|
| ts0 | 1->0 | 2->0 | 3->0 |
| ts1 | 4->1 | 5->1 | 9->3 |
| ts2 | 6->1 | 10->3 | 7->4 |
| ts3 | 8->4 | 13->9 | 11->10 |
| ts4 | 14->9 | 12->10 | |
| ts5 | 15->9 | 16->12 | |
| ts6 | 17->12 | | |
| ts7 | | | |
| ts8 | | | |

WIRELESS COMMUNICATION NETWORK INCLUDING NETWORK COORDINATOR ASSIGNING TIME SLOTS AND CHANNELS TO NODES TO PROVIDE COLLISION-FREE SCHEDULES AND DATA AGGREGATION METHOD FOR THE SAME

BACKGROUND OF THE INVENTION

1. Field of the Invention

This invention pertains generally to communication networks and, more particularly, to wireless communication networks including a network coordinator. The invention also pertains to data aggregation methods for wireless communication networks.

2. Background Information

Wireless communication networks are an emerging new technology, which allows users to access information and services electronically, regardless of their geographic position.

All nodes in ad-hoc wireless communication networks are potentially mobile and can be connected dynamically in an arbitrary manner. All nodes of these networks behave as routers and take part in discovery and maintenance of routes to other nodes in the network. For example, ad-hoc wireless communication networks are very useful in emergency search-and-rescue operations, meetings or conventions in which persons wish to quickly share information, and in data acquisition operations in inhospitable terrains.

An ad-hoc mobile wireless communication network comprises a plurality of mobile nodes, each of which is able to directly communicate with its neighboring mobile nodes, which are a single hop away. In such a network, each mobile node acts as a router forwarding packets of information from one mobile node to another. These mobile nodes communicate with each other over a wireless media, typically without any infra-structured (or wired) network component support.

In contrast to wired networks, mesh-type, low rate-wireless personal area network (LR-WPAN) wireless communication networks are intended to be relatively low power, to be self-configuring, and to not require any communication infrastructure (e.g., wires) other than power sources.

During radio frequency communication between a network coordinator and one or more network devices, communications may be hindered or interrupted by one or more sources of background noise at various frequencies. One known method of dealing with such background noise is for the network coordinator to configure its radio (i.e., a wireless transceiver) to leave the present wireless channel (i.e., a first radio frequency band), to scan other wireless channels (i.e., other radio frequency bands) with that same radio, and to return to the present wireless channel and use the radio to notify the network devices to migrate to a new wireless channel (i.e., one of the other radio frequency bands).

In a large scale wireless lighting application, after the ballasts receive a broadcast command from a node, such as a network coordinator (e.g., iZAP™ marketed by Eaton Electrical, Inc. of Milwaukee, Wis.), the individual status (e.g., without limitation, on; off; light level; mains energy) of each ballast needs to be sent back to that node as fast as possible (e.g., ideally, below 1 second; below 5 seconds). There may be up to about 500 or more ballasts. A link between a ballast and the network coordinator may potentially interfere with another link between another ballast and the network coordinator if the same channel is used.

One prior proposal is Carrier Sense Multiple Access (CSMA), which is a probabilistic Media Access Control (MAC) protocol in which a node verifies the absence of other communication traffic before transmitting. The node's transceiver listens for a carrier wave before trying to send. In other words, it tries to detect the presence of a signal from another node before attempting to transmit. If a carrier is sensed, then the node waits for the transmission in progress to finish before initiating its own transmission. Of course, multiple different nodes send and receive on the same medium, and transmissions by one node are generally received by all or a number of other nodes using the same medium. Hence, CSMA causes unnecessary collisions and, therefore, is too slow.

Time Division Multiple Access (TDMA) is a channel access method for shared medium (usually radio) networks. It allows several users (nodes) to share the same frequency channel by dividing the signal into different time slots. The nodes transmit in rapid succession, one after the other, each using its own time slot. This allows multiple nodes to share the same transmission medium (e.g., radio frequency channel), while using only the part of its bandwidth that they require.

TDMA is used, for example, in the digital 2G cellular systems, such as Global System for Mobile Communications (GSM), IS-136, Personal Digital Cellular (PDC) and iDEN, and in the Digital Enhanced Cordless Telecommunications (DECT) standard for portable phones. It is also used extensively in satellite systems, and combat-net radio systems.

The TDMA frame structure includes a data stream divided into frames and those frames are divided into time slots. TDMA is a type of time-division multiplexing, with the special point that instead of having one transmitter connected to one receiver, there are multiple transmitters. In the case of the uplink from a mobile telephone to a base station, this becomes particularly difficult because the mobile telephone can move around and vary the timing advance required to make its transmission match the gap in transmission from its peers.

There is room for improvement in wireless communication networks.

There is also room for improvement in data aggregation methods for wireless communication networks.

SUMMARY OF THE INVENTION

These needs and others are met by embodiments of the invention, which provide an efficient solution for relatively fast status information collection for a wireless communication network. The wireless communication network may be a wireless ad-hoc communication network in which channels, radio transceivers and time slots are allocated to guarantee communication efficiency.

In accordance with one aspect of the invention, a wireless communication network comprises: a network coordinator comprising a first number of channels and a second number of wireless transceivers; and a plurality of nodes, each of the nodes comprising status information, a corresponding second number of channels and a corresponding second number of wireless transceivers, wherein at least some of the nodes are structured to communicate with the network coordinator through multi-hop communication, wherein the nodes and the network coordinator are structured to communicate in a Carrier Sense Multiple Access mode, wherein each of the nodes is structured to communicate the status information thereof to or toward the network coordinator in a Time Division Multiple Access mode, wherein the Time Division Multiple Access mode has a plurality of time slots, wherein the network coordinator is structured to assign the time slots and the channels to the nodes in order to provide a plurality of collision-free schedules for the nodes in the Time Division Multiple Access mode, and wherein the network coordinator is further structured to send, for each of the nodes, a corresponding one of the collision-free schedules to or toward a corresponding one of the nodes, the corresponding one of the collision-free schedules including a corresponding number of the time slots and a corresponding number of the channels that the corresponding one of the nodes employs to communicate the status information thereof to or toward the network coordinator in the Time Division Multiple Access mode.

As another aspect of the invention, a data aggregation method is for a wireless communication network including a plurality of nodes, the nodes including a network coordinator, a plurality of child nodes and a plurality of parent nodes. The method comprises: defining a network topology of a plurality of pairs of the child nodes and the parent nodes in the wireless communication network, each of the pairs including one of the child nodes and one of the parent nodes; collecting network topology information from the wireless communication network and assigning a plurality of time slots and a number of channels to the nodes in order to provide a plurality of collision-free schedules for all of the nodes; for each of the child nodes and the parent nodes, sending a corresponding collision-free schedule to or toward a corresponding one of the child nodes and the parent nodes; including, with the corresponding collision-free schedule, a corresponding time slot and a corresponding channel that the corresponding one of the child nodes and the parent nodes employs to send status information to or toward the network coordinator; and for each of the child nodes and the parent nodes, starting at the corresponding time slot, sending the status information to or toward the network coordinator on the corresponding channel.

The method may build an address tree topology in order that the network coordinator is the root of the address tree topology and the child nodes and the parent nodes are descendants of the network coordinator; employ a first constraint whereby each of the parent nodes cannot send the status information to or toward the network coordinator until each of the parent nodes receives the status information from all of its child nodes; and employ a second constraint whereby none of the pairs can send the status information simultaneously over the same one of the channels.

The method may further employ a third constraint as being a maximum count of the channels; employ a fourth constraint as being a maximum count of radio transceivers for the wireless communication network; and employ a fifth constraint as being a maximum count of the radio transceivers for each of the child nodes and the parent nodes.

The method may still further employ a sixth constraint as being a maximum time for the network coordinator to receive all of the status information from the child nodes and the parent nodes.

As another aspect of the invention, a wireless communication network comprises: a network coordinator comprising a first number of channels and a second number of wireless transceivers; and a plurality of nodes, each of the nodes comprising status information, a corresponding second number of channels and a corresponding second number of wireless transceivers, wherein at least some of the nodes are structured to communicate with the network coordinator through multi-hop communication, wherein the nodes and the network coordinator are structured to communicate in a Carrier Sense Multiple Access mode, wherein the network coordinator is structured to command the nodes to exit the Carrier Sense Multiple Access mode and enter a Time Division Multiple Access mode, wherein each of the nodes is structured to communicate the status information thereof to or toward the network coordinator in the Time Division Multiple Access mode, wherein the Time Division Multiple Access mode has a plurality of time slots, and wherein the network coordinator is structured to assign the time slots and the channels to the nodes in order to provide a plurality of collision-free schedules for the nodes in the Time Division Multiple Access mode.

BRIEF DESCRIPTION OF THE DRAWINGS

A full understanding of the invention can be gained from the following description of the preferred embodiments when read in conjunction with the accompanying drawings in which:

FIGS. 3A and 3B are flowcharts of the normal operation of the wireless communication network of FIG. 1 including a feedback TDMA phase.

FIG. 6 is pseudo-code of a visit_node algorithm for the time slot and channel selection of FIG. 5.

DESCRIPTION OF THE PREFERRED EMBODIMENTS

Figure 1:
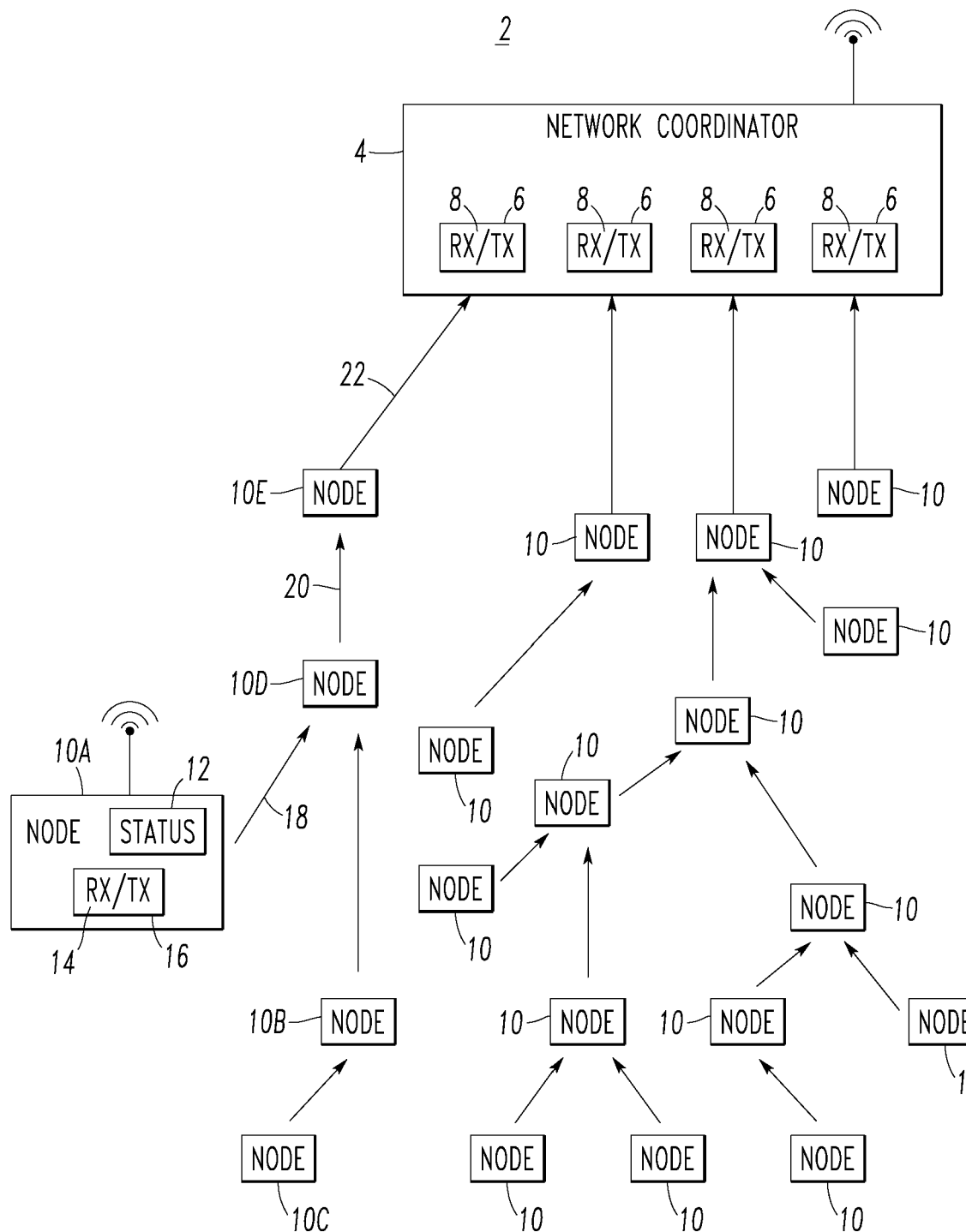
FIG. 1 is a block diagram of a wireless communication network in accordance with embodiments of the invention.

As employed herein, the term "number" shall mean one or an integer greater than one (i.e., a plurality).

As employed herein, the term "wireless" shall expressly include, but not be limited by, radio frequency (RF), light, visible light, infrared, ultrasound, wireless area networks, such as, but not limited to, IEEE 802.11 and all its variants (e.g., without limitation, 802.11a; 802.11b; 802.11g), IEEE 802.15 and all its variants (e.g., without limitation, 802.15.1; 802.15.3, 802.15.4), IEEE 802.16 and all its variants, other wireless communication standards (e.g., without limitation, ZigBee™ Alliance standard), HyperLan, DECT, PWT, pager, PCS, Wi-Fi, Bluetooth™, and cellular.

As employed herein, the term "wireless communication network" means a communication network employing wireless communications, such as, for example and without limitation, a wireless sensor network.

As employed herein, the term "wireless sensor network" means a network comprising spatially distributed autonomous nodes using devices to control outputs and/or sensors to receive inputs that cooperatively sense, for example, physical or environmental conditions, such as for example and without limitation, light, temperature, sound, vibration, pressure, motion or pollutants, at different locations. Non-limiting examples of wireless sensor networks include a wireless facilities management system or a wireless infrastructure management system employed for environment and/or habitat monitoring, healthcare applications, home automation, commercial lighting control or traffic control. Each node in a wireless sensor network is typically equipped with a radio transceiver or other suitable wireless communication device, a processor (e.g., small microcontroller), and an energy source, such as a battery or a mains-powered energy source.

As employed herein, the term "network coordinator" (NC) means any communicating device, which operates as the central controller in an ad-hoc communication network.

As employed herein, the term "network device" (ND) means any communicating device (e.g., without limitation, a ballast; a portable wireless communicating device; a fob; a camera/sensor device; a wireless camera; a control device; and/or a fixed wireless communicating device, such as, for example, switch sensors, motion sensors or temperature sensors as employed in a wirelessly enabled sensor network), which participates in a wireless communication network, and which is not a network coordinator.

As employed herein, the term "node" means NDs, NCs, as well as any processing, logging and/or communicating device (e.g., without limitation, a portable communicating device; a fixed communicating device, such as, for example, switches, motion sensors or temperature sensors as employed in a wireless sensor network), which participates in an ad-hoc communication network.

As employed herein, the term "sensor" means an apparatus structured to input data or information and to output related data or information to a wireless communication network. A sensor may optionally include or be operatively associated with zero or a number of devices. Non-limiting examples of sensors include sensors structured to sense light, switch sensors, pushbutton sensors, motion sensors, temperature sensors, sound sensors, vibration sensors, pollution sensors, current sensors and/or voltage sensors.

As employed herein, the term "device" means an apparatus structured to input data, information or a control command from a wireless communication network or a wired communication network and to output corresponding data, corresponding information or a corresponding control action. A device may optionally include or be operatively associated with zero or a number of sensors. Non-limiting examples of devices include ballasts, lights, power relays, water valves, data collection and/or network bridges.

As employed herein, the term "child node" means a node that communicates, for example, status information to a parent node or to a network coordinator.

As employed herein, the term "parent node" means a node that receives, for example, status information from a child node or another parent node, and communicates, for example, that status information to another parent node or to a network coordinator. For example, a first parent node receives status information from a child node or from a different second parent node, and communicates, for example, that status information to a different third parent node or to a network coordinator.

As employed herein, the term "mains-powered" refers to any node, which has continuous power capabilities (e.g., powered from an AC outlet or AC receptacle or AC power source; AC/DC powered devices; rechargeable battery powered devices; other rechargeable devices), but excluding non-rechargeable battery powered devices.

The invention is described in association with a large-scale wireless sensor network that sends status information from all the nodes in the network to a network coordinator, preferably within a predetermined deadline, although the invention is applicable to a wide range of wireless communication networks.

Referring to FIG. 1, a wireless communication network, such as the example wireless sensor network 2, is shown. The wireless sensor network 2 includes a network coordinator (NC) 4, which has a number of wireless transceivers 6 with a number of communication channels 8, and a plurality of nodes 10. As shown with node 10A, each of the nodes 10 includes status information 12, a corresponding number of communication channels 14 and a corresponding number of wireless transceivers 16.

At least some of the nodes 10, such as 10A,10B,10C, are structured to communicate with the NC 4 through multi-hop communication. For example, node 10A communicates its status information 12 to the network coordinator 4 through a first wireless message 18 from node 10A to node 10D, then node 10D forwards that status information (along with its status information) through a second wireless message 20 from node 10D to node 10E, and then node 10E forwards that status information (along with its status information) through a third wireless message 22 from node 10E to the NC 4.

Figure 4:
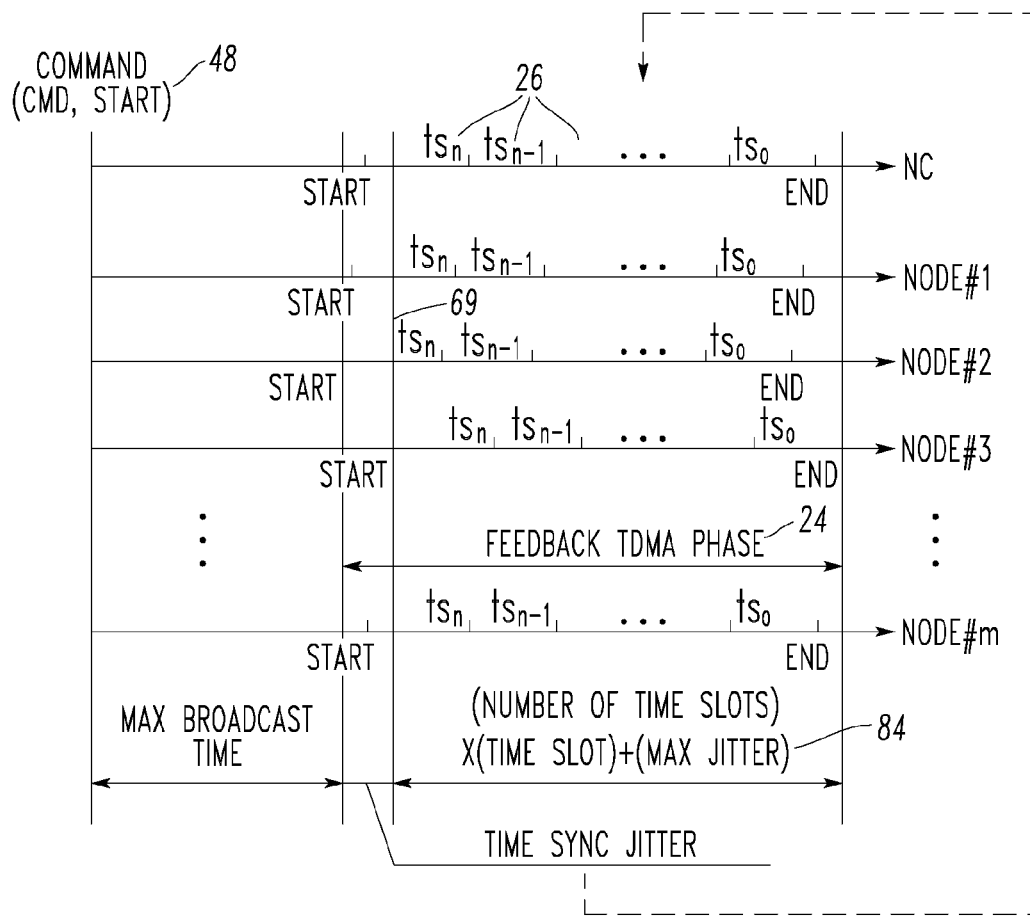
FIG. 4 is a timeline showing the feedback TDMA phase of FIGS. 3A and 3B.
Figure 5:
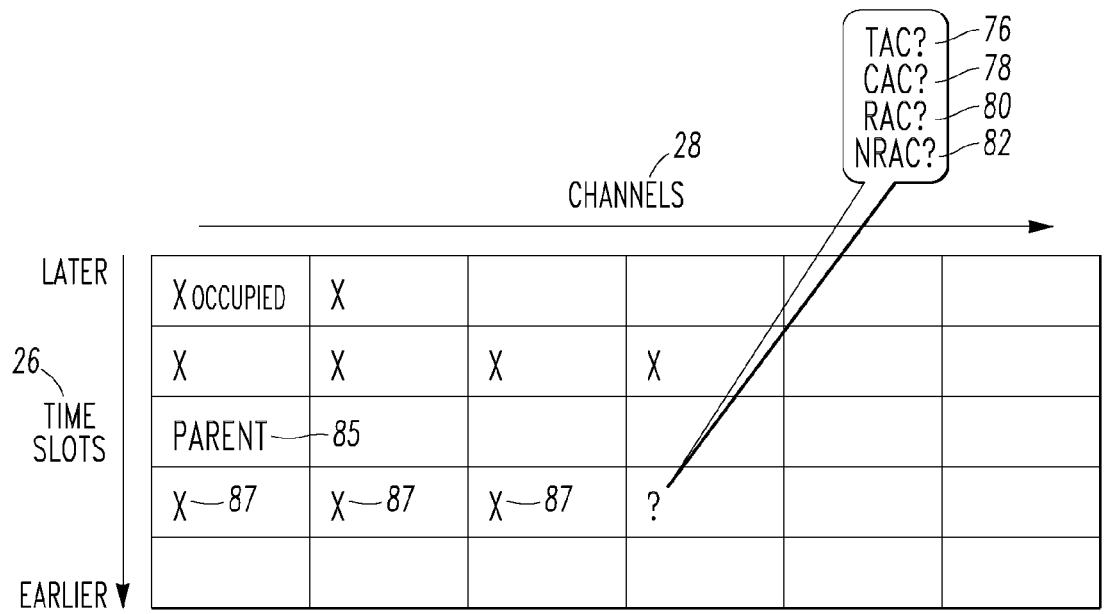
FIG. 5 is chart showing the network coordinator's selection of a time slot and a channel for plural nodes based upon plural different constraints.

As will be explained, below, in connection with FIGS. 3A-3B and 4, the communication of the node status information 12 to or toward the NC 4 occurs in a Time Division Multiple Access (TDMA) mode 24 (FIG. 4) (feedback TDMA phase), which has a plurality of time slots 26 (FIG. 5).

As will be explained, below, in connection with FIGS. 2, 5, 6, 7A, 7B, 8 and 9, the NC 4 is structured to assign the time slots 26 and the number of communication channels 28 to the nodes 10, in order to provide a plurality of collision-free schedules 30 (FIG. 7B) for the nodes 10 in the TDMA mode 24. Each of the schedules 30 includes a corresponding number of the time slots 26 and a corresponding number of the communication channels 28 that the corresponding one of the nodes 10 employs to communicate the status information 12 thereof to or toward the NC 4 in the TDMA mode 24.

As shown in FIG. 1, node 10C is a child node of parent node 10B; node 10B is a child node of parent node 10D; node 10D is a child node of parent node 10E; and node 10E is a child node of the NC 4. As will be explained, below, in connection with FIGS. 7A, 7B, 8 and 9, a child node, such as 10D, communicates the status information 12 of that child node to its parent node, such as 10E, in a first one of the time slots 26 in the TDMA mode 24, and the parent node, such as 10E, communicates that child status information (along with its status information) to or toward the NC 4 in a second one of the time slots 26 after the first one of the time slots in the TDMA mode 24.

EXAMPLE 1

In order to minimize collisions, there are multiple channels 8,14 (e.g., without limitation, 2; 4; 8; 16; any suitable count of channels) for the wireless sensor network 2 and one or more radio transceivers 16 for each of the nodes 10. The operation time of the wireless sensor network 2 is divided into relatively short time slots 26 with identical durations. For each time slot 26, a subset (one or more) of the nodes 10 is scheduled to forward the status information 12 of their own and their descendants (e.g., their children; their grandchildren; their great-grandchildren) to their corresponding parent nodes, in a fashion that avoids collisions for efficiency.

EXAMPLE 2

Figures 7A, 7B:
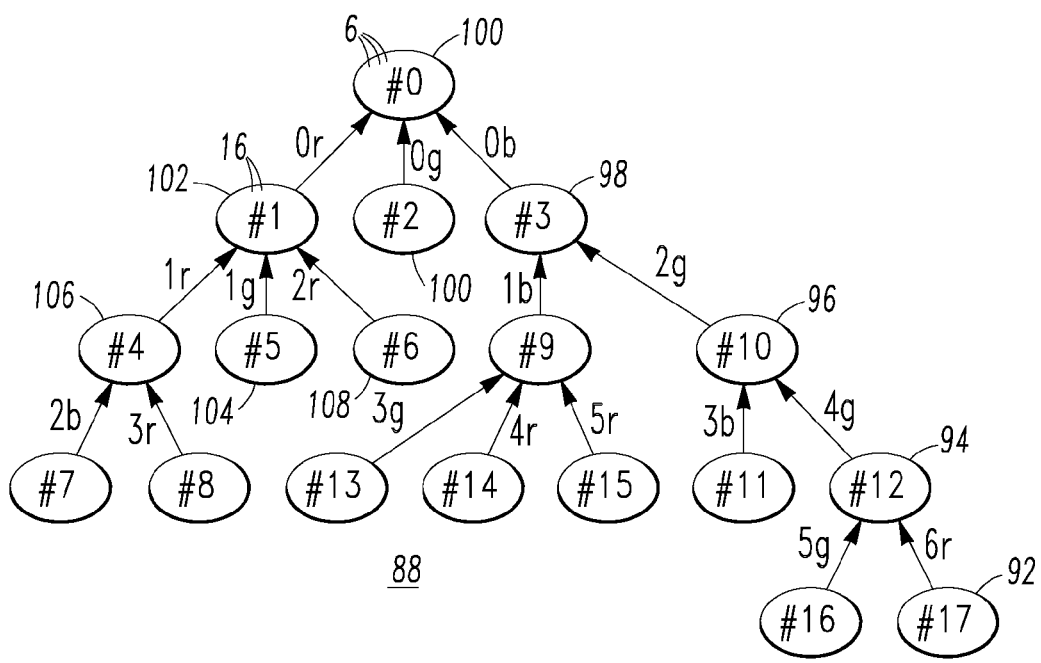
FIGS. 7A and 7B respectively show a block diagram of a wireless communication network and the corresponding node time slot and channel selections.
Figure 8:
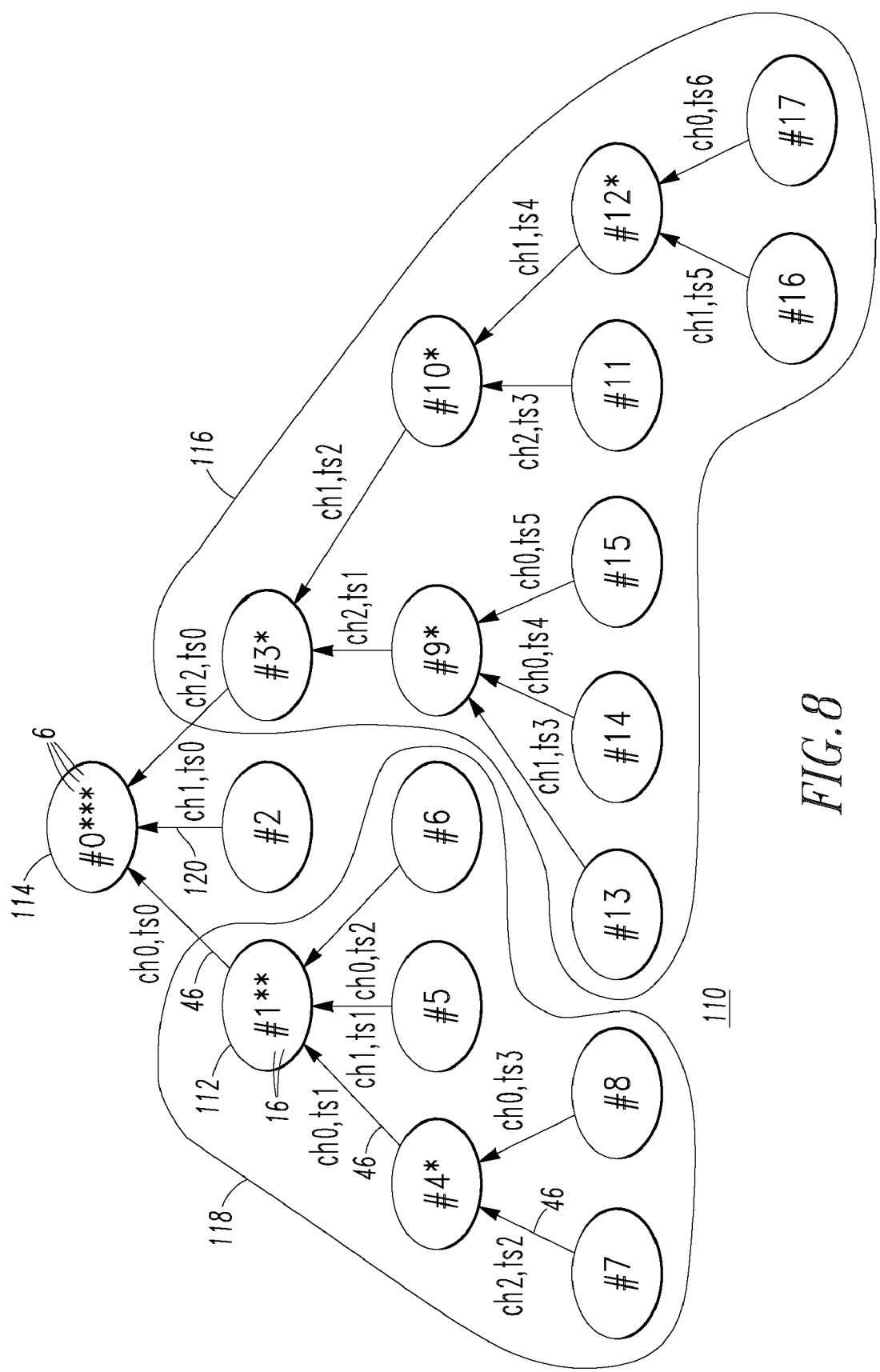
FIG. 8 shows a block diagram of a wireless communication network and the corresponding node time slot and channel selections based upon a breadth first selection.
Figure 9:
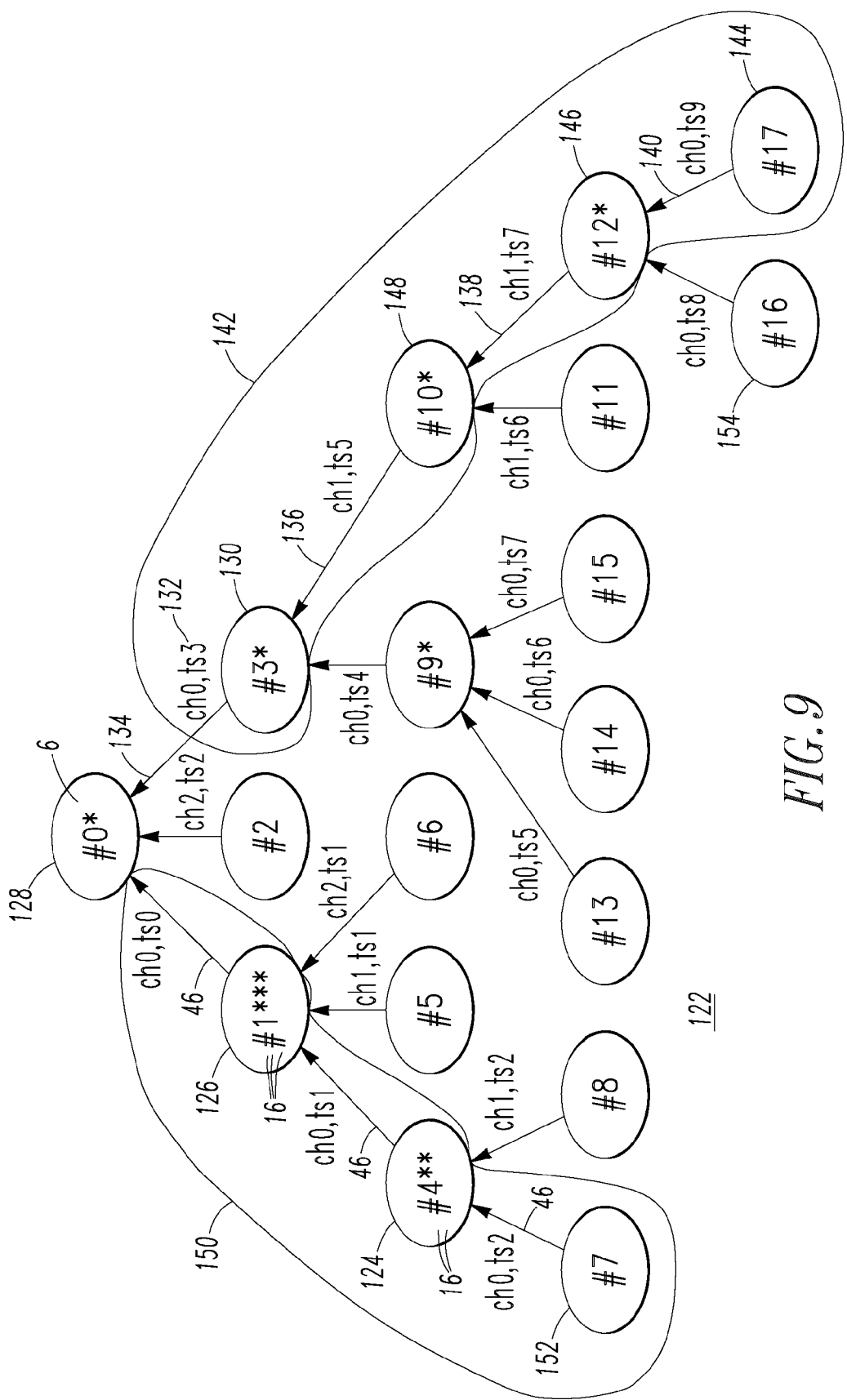
FIG. 9 shows a block diagram of a wireless communication network and the corresponding node time slot and channel selections based upon a depth first selection.

The example wireless sensor network 2 is based upon the following. First, an address tree topology (FIGS. 7A, 8 or 9)

is built in order that the NC 4 is the root of the tree and all the other nodes 10 are descendants of the NC 4. The tree is preferably built in a manner in order that the packet delivery success rate is very close to about 100%. Second, transmissions from the different wireless channels 8,14 are assumed to not interfere with each other, while simultaneous transmissions may interfere with each other if they are in the same wireless channel. Third, the nodes 10 are preferably mains-powered in order that a reasonable synchronization update rate (e.g., without limitation, about one packet per minute) can be supported. Finally, the count of the nodes 10 may be, for example and without limitation, in the range of about 500 to about 1000.

EXAMPLE 3

The example constraints for this scheduling are as follows. First, a node 10 (e.g., 10D) cannot send the status information 12 to its parent node (e.g., 10E) until it gathers all the status information 12 from its children (e.g., 10A and 10B). This is a Time slot Allocation Constraint (TAC): a node's time slot (TS) 26 number must be greater than its parent's TS 26 number. Before a parent node (e.g., 10D) can report to its own parent node (e.g., 10E), it needs to wait until its child nodes (e.g., 10A and 10B) report to it.

Second, no two nodes 10 can send information simultaneously in the same communication channel 14.

Third, there is an upper limit of the number of communication channels 8,14 (Channel Allocation Constraint (CAC)), the number of radio transceivers 6,16 for the whole wireless sensor network 2 (Radio Allocation Constraint (RAC)), and the number of radio transceivers 16 for each individual node 10 (Node Radio Allocation Constraint (NRAC)). The number of communication channels 8,14 is limited (CAC). For example, without limitation, there may be 16 different communication channels 14 for a 2.4 GHz wireless sensor network in which four communication channels are well separated. There may be a maximum number of total extra transceivers 16 (RAC) as a cost consideration. There may be a maximum number of transceivers 16 on a single node 10 (NRAC) in order to avoid excessive hardware/software complexity.

Finally, the total time from the start of the whole transmission process until the NC 4 receives all of the status information 12 from its child nodes 10 is bounded for quality.

EXAMPLE 4

Figure 2:
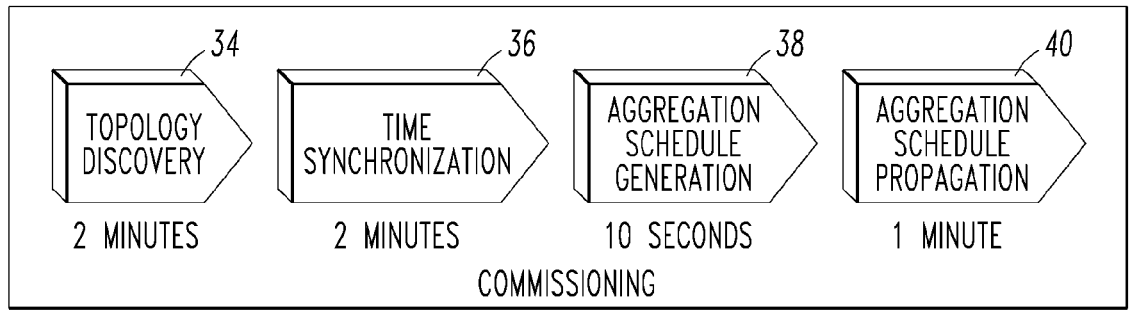
FIG. 2 is a flowchart of the commissioning phase of the wireless communication network of FIG. 1.

FIG. 2 shows an example commissioning phase 32 of the wireless communication network 2 of FIG. 1. This phase 32 includes three distinct sub-phases: (1) topology discovery 34 in which the NC 4 builds and collects information of the spanning tree (FIGS. 7A, 8 or 9); (2) time synchronization 36; and (3) calculate (schedule generation 38) and propagate schedules (schedule propagation 40) by the NC 4. Then, after a command broadcast 42 (FIG. 3A), there is the start of a TDMA aggregation session 44 (FIGS. 3A and 3B) (or TDMA mode 24 of FIG. 4). During the commissioning phase 32, the NC 4 builds the spanning tree (FIGS. 7A, 8 or 9) including a plurality of edges 46 (FIGS. 8 and 9), calculates the collision-free schedules 30 (FIG. 7B), and communicates, at 40, the collision-free schedules 30. As shown in FIGS. 8 and 9, each of the edges 46 has a child node and a parent node of the nodes 10.

First, as part of topology discovery 34, the spanning tree is built in the wireless sensor network 2. Each child/parent pair of nodes 10 is an edge of the spanning tree.

Next, as part of time synchronization 36, a suitable time synchronization protocol is applied to get a consistent global view of time for the whole wireless sensor network 2, although small jitters in synchronization are tolerated. With time synchronization, by a global time t, all nodes 10 refer to the same time with a relatively very small jitter. The messages used for time synchronization are sent using CSMA with a relatively low update rate to reduce overhead. During the relatively short TDMA mode 24, the time synchronization process is paused to avoid interfering with the status reporting messages. After the TDMA mode, the network switches back to the CSMA mode, at 54, and time synchronization is resumed. For example, a well-known time synchronization protocol "Flooding Time Synchronization Protocol" (FTSP) features a relatively low synchronization jitter (e.g., less than about 100 µS) with a relatively low update rate (e.g., about once per minute; about once per 30 seconds).

Next, during schedule generation 38, the duration of each of the time slots 26 is decided. The time slot 26 is preferably as short as possible, in order to allow for as many time slots 26 as possible within the bounded deadline requirement. On the other hand, the time slot 26 should accommodate at least one packet transmission and the maximum synchronization jitter 84 (FIG. 4) among the nodes 10, otherwise the schedules 30 cannot properly be enforced. The input of the channel assignments is the network topology that defines all of the child/parent pairs of the nodes 10 in the wireless sensor network 2. The NC 4 collects the network topology information and then executes a channel assignment algorithm (FIGS. 5 and 6) to assign the time slots 26 and the communication channels 28 to the nodes 10, in order to provide the collision free schedules 30 for all nodes 10 in the network 2 that satisfy all resource constraints (i.e., TAC 76; CAC 78; RAC 80; NRAC 82), as discussed above (Example 3) and below (Example 7).

After that, during schedule propagation 40, the NC 4 sends the corresponding collision-free schedules 30 to or toward each individual node 10 (i.e., each of the child nodes and each of the parent nodes), with a specified time to start the corresponding schedule 30. Each schedule 30 includes a corresponding time slot 26 and a corresponding channel 28 that a corresponding node 10 employs to send its status information 12 to its parent node and, thus, to or toward the NC 4. Starting from the specified time, each node 10 sends its status information 12 according to the schedule 30 that it receives.

EXAMPLE 5

Referring to FIGS. 3A and 3B, the TDMA aggregation session 44 occurs during part of Carrier Sense Multiple Access (CSMA) normal operation 45. During the normal operation 45, there is one NC control command 48, which occurs in less than about one second. Although only one command 48 is sent at one time, this command may contain different parameters for different instances. For example, without limitation, sometimes the command can be "turn on all lights" while sometimes the command can be "turn off all lights". Next, at the command broadcast 42, the NC 4 broadcasts a command (e.g., STOP TIMESYNC) to cause the other nodes 10 to stop the time synchronization, at event 50, and to wait, at event 52, for the TDMA aggregation session 44. The events 50,52 are internal events in the nodes 10 that are triggered some time after an NC command reaches the node. This process takes about one second and is followed by the TDMA aggregation session 44, which takes about one second.

The TDMA aggregation session 44 (FIGS. 3A and 3B) starts only after the STOP TIMESYNC command is sent at 42. The TDMA aggregation session 44 is employed through a suitable time synchronization. Each node 10 takes a time slot 26. The time slot 26 and channel 28 are pre-calculated as a schedule 30 by the NC 4. The receiving nodes 10 switch to the proper channel 28 (according to its corresponding schedule 30) to receive. The time slot 26 cannot be too short, since it has to be able to accommodate the transmission and the jitter, or too long, since otherwise it may hurt the performance. After the NC 4 propagates the schedules 30 to the nodes 10 at 40 (FIG. 2), the nodes 10 report their status information 12 from the bottom-up as shown by FIG. 1. Hence, for each of the child nodes and the parent nodes, starting at the corresponding time slot 26, the corresponding node 10 sends the status information 12 to or toward the NC 4 on the corresponding channel 28.

EXAMPLE 6

For example, the command 48 is sent from the outside (e.g., without limitation, a user may push a button (not shown) on the NC 4, which broadcasts the command 48 to all of the nodes 10) of the wireless sensor network 2 (e.g., from a user; from an occupancy sensor; from another sensor(s)) at an arbitrary time. Each command 48 contains a "starting time" field. When each node 10 receives the command 48, it starts the TDMA aggregation session 44 at the globally aligned starting time (with any jitter). The starting time needs to be late enough in order that there is enough time for all the nodes 10 to receive the flooding information. The command 48 is sent by a best-effort broadcast. After the "starting time", the broadcast stops. This provides robustness in the event that a number of the nodes 10 do not hear this command 48. Each node 10 overhears its neighbor nodes, if they are sending the status messages, and it will try to align itself to them, then send its message accordingly or keep silent to avoid a collision.

The NC 4 broadcasts packets with a start of frame delimiter (SFD) timestamp embedded therein according to a suitable synchronization frequency. The SFD is a signal triggered at the beginning of the transmission/reception of a message (frame). Timestamping the SFD on both the transmitter and the receiver for the same message is a very effective and precise mechanism for time synchronization. The other nodes 10 receive the broadcast packets including the SFD timestamp. Depending upon whether the SFD timestamp is received from the NC 4 or from other nodes 10 closer (in hops) to the NC 4, a node 10 adjusts its local clock (not shown) according to the received packet and estimates clock drift (based on a linear regression of the past eight data points, each as a pair of transmitter/receiver timestamps) and broadcasts another packet with the SFD timestamp with adjustment for estimated clock drift embedded therein.

FIG. 4 shows time lines on the NC 4 and the nodes 10. This includes the effects of the initial broadcast time and the time synchronization jitters. The NC and the nodes wait for a maximum broadcast time and switch to the TDMA aggregation session 44. FIG. 4 also shows the jitters among the nodes 10 due to the limitation of any practical time synchronization mechanism. After all of the time slots 26, the NC 4 and each of the nodes 10 switch back to the CSMA mode 45.

After the TDMA aggregation session 44, at 54, there is a command (RESUME TIMESYNC) from the NC 4 to the nodes 10 to cause them to switch back, at event 56, to the CSMA normal operation 45. This takes less than about 0.1 second. Then, after less than about 0.1 second, the nodes 10 resume the CSMA normal operation 45.

During the TDMA aggregation session 44, the nodes 10 all switch to this mode at 57 (FIG. 3B) and, based upon the corresponding different time slots 26, assume the role of a parent node 60 or a child node 66. For example, many nodes 10 may assume both of the roles of parent node and child node in different time slots 26, while some of the nodes 10 (e.g., node 10C of FIG. 1) will only assume the child node role and only the NC 4 will assume only the parent node role. After all of the time slots 26 are processed, the nodes 10 wait for the TDMA aggregation session 44 to end at 58.

For the parent node role, at 60, a node 10 waits, at 62, for the corresponding time slot 26 to receive status and then changes to the scheduled channel, at 64, in order to receive the status from the child node.

For the child node role, at 66, a node 10 waits, at 68, for the corresponding time slot 26 to send its status, changes to the scheduled channel at 70, waits for a predetermined (e.g., based upon empirical measurements) maximum jitter period at 72, and sends its status to its parent node at 74.

For schedule enforcement, after a user issues the command 48 to the NC 4, the NC 4 broadcasts that command to the nodes 10. The command broadcast packet is attached with a starting time, in order that all the nodes 10 start the time slots 26 at the same time with the variation of the time synchronization jitters. When each node 10 reaches this starting time, it starts the time slots 26. For example, node #2 does so at 69 of FIG. 4. During a time slot 26 in which a node 10 needs to receive or send a message based on the corresponding schedule 30 from the NC 4, it switches to the corresponding channel 28. Based on the generation, at 38 (FIG. 2), of schedules 30, a node 10 sends its status information 12 after it receives all the status information 12 from its child nodes. If a node 10 does not receive all the child status information 12 within the scheduled time due to packet loss, then it reports the exceptions.

As shown in FIG. 4, the NC 4 repeats the feedback TDMA phase 24 (TDMA mode) in response to the next command 48. Each of the nodes 10 communicates the status information 12 thereof to or toward the NC 4 in the repeated TDMA mode 24.

EXAMPLE 7

FIG. 5 shows the selection of time slots 26 and channels 28 by the NC 4 for the various nodes 10 based upon plural different constraints including TAC 76, CAC 78, RAC 80 and NRAC 82, as were discussed above. The channel assignment protocol includes three different sub-phases 34,36,38 as shown in FIG. 2. In topology discovery 34, during the commissioning phase 32, nodes 10 in the wireless sensor network 2 randomly broadcast packets to their neighborhoods. Each node 10 maintains a table of the Receive Signal Strength Indicator/Link Quality Indicator (RSSI/LQI) information for all nodes 10 that can reach it. After that, each node 10 broadcasts its table of the RSSI/LQI information to its neighborhood. Therefore, each node 10 has the information of the two-way communication quality between itself and each node 10 it may reach. Each node 10 selects the nodes 10 having the two-way communication qualities (RSSI/LQI) above two corresponding predefined thresholds as its direct neighbors. The NC 4 broadcasts its list of direct neighbors and recruits them as its children. After that, each child node recruits its own children. If a node 10 receives more than one recruiting message, then it chooses the node 10 closest to the NC 4 as its parent node. This process is iterated until all nodes 10 in the wireless sensor network 2 are included in the topology tree.

Next, for channel assignment, which occurs as part of schedule generation 38 (FIG. 2), the duration of the time slot 26 is first selected by the NC 4 as the maximum transmission time of the status information 12 packet(s) plus the maximum synchronization jitter 84 (FIG. 4) multiplied by two. This guarantees that a transmitter and a receiver can be properly coordinated for each transmission. Here, when a sender node 10 sends, it guarantees that the intended receiver node 10 is ready (in the correct channel 28). A receiver node 10 waits until the sender node 10 finishes the transmission before the receiver node 10 moves to the next time slot 26 and switches its channel 28.

The channel/time slot schedules 30 are generated, at 38, by the NC 4, which maintains a table as shown, for example, in FIGS. 5 and 7B. Each row of the table 90 (FIG. 7B) corresponds to a time slot 26 and each column of the table 90 corresponds to a channel 28. The NC 4 traverses all other nodes 10 following a breadth first (FIG. 8) or width first (FIG. 9) order, and the branches 116 (FIG. 8) with more child nodes are visited earlier than those branches 118,120 with fewer child nodes. The schedule 30 of each node 10 is generated when it is visited.

EXAMPLE 8

FIG. 6 shows an example visit_node algorithm 86 for the time slot 26 and channel selection of FIG. 5. This shows the general algorithm of what happens when a node 10 is "visited", regardless of the order (e.g., without limitation, breadth first; depth first). During this process, the NC 4 first finds the time slot 26 closest to a node's parent node conforming to TAC 76. Then, it tries to accommodate the node 10 into this time slot 26 while, at the same time, conforming to CAC 78, RAC 80 and NRAC 82 constraints. If the NC 4 can find a channel 28 for the node 10, then the node's schedule 30 is decided. Otherwise, the NC 4 finds an earlier time slot 26 and verifies if CAC 78, RAC 80 and NRAC 82 are all satisfied. This process continues until a time slot 26/channel 28 assignment for the node 10 can be made satisfying all four constraints: TAC 76, CAC 78, RAC 80 and NRAC 82. After all nodes' schedules 30 are generated, the NC 4 propagates them to the corresponding nodes as part of schedule propagation 40 (FIG. 2). The time slot 85 for a parent node is later than the time slots 87 for its children.

EXAMPLE 9

FIGS. 7A and 7B show an example wireless communication network 88 and a table 90 of node time slots 26 (e.g., time slot "ts0" through "ts8") and three example channels 14 (e.g., "r", "g" and "b") that are selected based upon the algorithm 86 of FIG. 6. Here, each of the nodes 10 (FIG. 1) and the NC 4 (FIG. 1) has a maximum of three example transceivers 16 and 6, respectively. Also, three example extra transceivers 6,16 are allocated in the network 88 as follows: node (#1) 102 has two transceivers 16 (one extra) and node (#0) 100 has three transceivers 6 (two extra).

Some of the intersections of the time slots 26 and channels 14 have corresponding schedules 30. For example, schedule 30A corresponds to time slot "ts6" and channel "r" during which child node (#17) 92 communicates its status information 12 to its parent node (#12) 94; schedule 30B corresponds to time slot "ts4" and channel "g" during which child node (#12) 94 communicates that status information to its parent node (#10) 96; schedule 30C corresponds to time slot "ts2" and channel "g" during which child node (#10) 96 communicates that status information to its parent node (#3) 98; and schedule 30D corresponds to time slot "ts0" and channel "b" during which child node (#3) 98 communicates that status information to its parent node (#0) 100, which in this example is the same as the NC 4 (FIG. 1). As shown in FIG. 4, the times slots 26 are ordered in time such that the last timeslot 26 ("ts8") in table 90 occurs first, while the first timeslot 26 ("ts0") in table 90 occurs last in the TDMA mode 24.

For the same timeslot 26 (e.g., "ts0") in table 90, the schedule 30E uses a different channel "g" for child node (#2) 100 to contemporaneously communicate its status information 12 to parent node (#0) 100 (NC 4); and the schedule 30F uses different channel "r" for child node (#1) 102 to contemporaneously communicate its status information 12 to parent node (#0) 100 (NC 4). In this example, the parent node (#0) 100 (NC 4) includes three of the transceivers 6 (FIG. 1).

For this example, the child nodes (#5) 104 and (#4) 106 communicate their respective status information 12 to their parent node (#1) 102 using the same one of the time slots 26 ("ts1") in the TDMA mode 24 and different ones of the channels 14 ("g" and "r"). Also, the child nodes (#6) 108 and (#4) 106 communicate their respective status information 12 to their parent node (#1) 102 using different ones of the time slots 26 ("ts2" and "ts1") in the TDMA mode 24 and the same one of the channels 14 ("r").

EXAMPLE 10

FIG. 8 shows an example wireless communication network 110 in which node time slots and three example channel selections ("ch0", "ch1" and "ch2") are selected based upon a breadth first selection. Here, each of the nodes 10 (FIG. 1) and the NC 4 (FIG. 1) has a maximum of three example transceivers 16 and 6, respectively. This example uses seven example time slots 14 ("ts6" through "ts0"). Also, three example extra transceivers 6,16 are allocated in the network 110 as follows: node (#1) 112 has two transceivers 16 (one extra) and node (#0) 114 (NC 4) has three transceivers 6 (two extra).

In this example, the NC 4 builds a spanning tree including a plurality of edges, a plurality of branches, a plurality of child nodes and a plurality of parent nodes. Each of the branches includes a number of the child nodes. The NC 4 first calculates one of the collision-free schedules 30 for one of the branches 116 having the largest count of the child nodes. Then, the NC 4 calculates the collision-free schedules 30 for the branch 118 having the next largest count of the child nodes. Finally, the NC 4 calculates the collision-free schedule 30 for the final branch 120, which has only one child node. During the initial scheduling process (FIG. 2), the children of each parent are reordered in order to generate schedules 30 for the branch 116 with the most children first, by which the overall performance is improved significantly for an unbalanced tree.

EXAMPLE 11

FIG. 9 shows an example wireless communication network 122 in which node time slots and three example channel selections ("ch0", "ch1" and "ch2") are selected based upon a depth first selection. Here, each of the nodes 10 (FIG. 1) and the NC 4 (FIG. 1) has a maximum of three example transceivers 16 and 6, respectively. This example uses ten example time slots 14 ("ts9" through "ts0"). Also, three example extra transceivers 16 are allocated in the network 122 as follows: node (#4) 124 has two transceivers 16 (one extra) and node (#1) 126 has three transceivers 16 (two extra). In this example, the node (#0) 128 (NC 4) has a single transceiver 6.

The branches 134,136,138,140 define a first multi-hop communication path 142 from child node (#17) 144 to parent node (#12) 146, which communicates, in turn, toward the node (#0) 128 (NC 4) through nodes 148 and 130. The branches 46 define a second multi-hop communication path 150 from child node (#7) 152 to parent node (#4) 124, which communicates, in turn, toward the node (#0) 128 (NC 4) through node 126. In this example, the NC 4 first calculates the collision-free schedules 30 for the relatively long first multi-hop communication path 142 before the NC 4 calculates the collision-free schedules 30 for the relatively shorter second multi-hop communication path 150. As shown in FIG. 9, the parent node 146 (#12) communicates the status information 12 of the child nodes 144,154 toward the NC 4 in a time slot ("ts7"), which is after (as was previously discussed above in connection with FIG. 7B) after the time slots ("ts9" and "ts8") of the respective child nodes 144 (#17) and 154 (#16).

EXAMPLE 12

Figure 10:
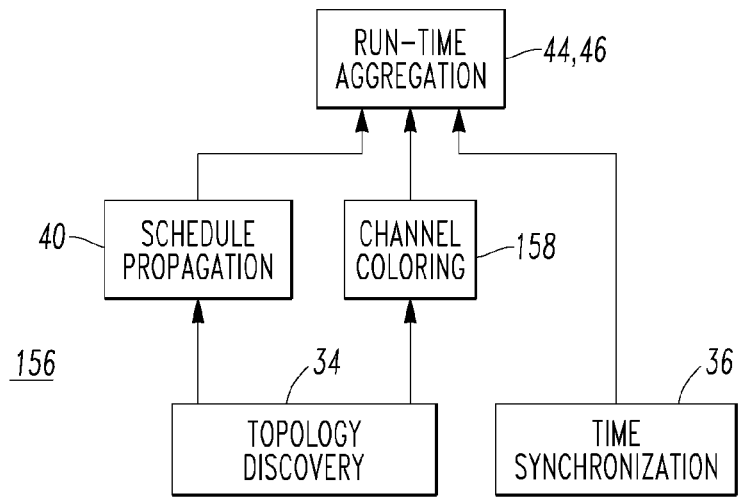
FIG. 10 is a block diagram of routines executed by the network coordinator and nodes of FIG. 1.

FIG. 10 shows the routines 156 generally executed by the NC 4 and nodes 10 of FIG. 1. Channel coloring 158 is an issue with the schedule generation 38 of FIG. 2 and the resulting assignment of the channels 28 (FIG. 5), since it affects performance (e.g., delay; number of time slots 26) significantly. The coloring problem is with the four constraints 76,78,80,82 in terms of how each individual constraint affects performance. Preferably, this is addressed by a suitable Constraint Satisfaction Problem (CSP) using artificial intelligence. Breadth first and depth first traversing and assignment of the time slots 26 and the channels 8 are two example solutions with good performance of the CSP. Only the NC 4 executes the channel coloring 158 and topology discovery 34 routines.

EXAMPLE 13

The maximum number of child nodes for each node 10 and the maximum depth is specified in a profile (not shown). The NC 4 obtains the address tree and the schedule calculation, at 38, is based on that topology.

EXAMPLE 14

The total number of time slots 26 does not increase significantly even when there is no extra radio transceiver 6,16 (i.e., less hardware/software complexity). Typically, the total number of time slots 26 is less than or equal to about 10 plus the number of reporting nodes 10 divided by the number of channels 28.

EXAMPLE 15

Increasing the average number of child nodes negligibly increases the number of time slots 26 being used.

EXAMPLE 16

For a node 10 (e.g., without limitation, node (#3) 130 of FIG. 9) relatively close to the root (e.g., without limitation, the NC 4; node (#0) 128 of FIG. 9), the status information 12 from all of that node's children may be too much to be contained in packets for one time slot 26 (e.g., "ts3"). Hence, such node may be assigned plural time slots 132.

EXAMPLE 17

Preferably, to address nodes 10 that fail or other nodes (not shown) that are later to be added into the wireless sensor network 2, some redundant empty time slots 26 may be employed (e.g., without limitation, the empty time slots 26 ("ts8" and "ts7" of FIG. 7B).

EXAMPLE 18

Preferably, the channels 8,14 are dynamically selected for the various collision-free schedules 30 to have good or otherwise desirable link qualities as opposed to selecting those channels having poor or otherwise undesirable link qualities.

The disclosed wireless sensor network 2 is highly valuable for wireless sensor network applications (e.g., without limitation, wireless based infrastructure management systems), in which timely collection of node status information 12 from the network 2 is a critical metric for network quality. The network 2 may work in the CSMA mode 45 (e.g., in the same manner as many popular wireless networks, such as, for example and without limitation, WiFi or ZigBee), while the TDMA mode 24 is triggered on demand and lasts a relatively very short period of time. Otherwise, except for the relatively very short TDMA periods, the network 2 may operate exactly the same as a CSMA-based network.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A wireless communication network comprising:
    a network coordinator comprising a first number of channels and a second number of wireless transceivers; and
    a plurality of nodes, each of said nodes comprising status information, a corresponding second number of channels and a corresponding second number of wireless transceivers,
    wherein at least some of said nodes are structured to communicate with said network coordinator through multi-hop communication,
    wherein said nodes and said network coordinator are structured to communicate in a Carrier Sense Multiple Access mode,
    wherein said network coordinator is structured to command said nodes to exit said Carrier Sense Multiple Access mode and enter a Time Division Multiple Access mode.
    wherein each of said nodes is structured to communicate the status information thereof to or toward said network coordinator in a Time Division Multiple Access mode,
    wherein said Time Division Multiple Access mode has a plurality of time slots,
    wherein said network coordinator is structured to assign said time slots and said channels to said nodes in order to provide a plurality of collision-free schedules for said nodes in said Time Division Multiple Access mode, and
    wherein said network coordinator is further structured to send, for each of said nodes, a corresponding one of said collision-free schedules to or toward a corresponding one of said nodes, said corresponding one of said collision-free schedules including a corresponding number of said time slots and a corresponding number of said channels that the corresponding one of said nodes employs to communicate the status information thereof to or toward said network coordinator in said Time Division Multiple Access mode.

2. The wireless communication network of claim 1 wherein said network coordinator is further structured to command said nodes to exit said Carrier Sense Multiple Access mode and enter said Time Division Multiple Access mode.

3. The wireless communication network of claim 1 wherein at least one of said nodes is a parent node; wherein at least one of said nodes is a child node of said parent node; wherein said child node is structured to communicate the status information of said child node to said parent node in a first one of said time slots in said Time Division Multiple Access mode; and wherein said parent node is structured to communicate the status information of said child node to or toward said network coordinator in a second one of said time slots after said first one of said time slots in said Time Division Multiple Access mode.

4. The wireless communication network of claim 1 wherein at least one of said nodes is a parent node; wherein a plurality of said nodes are child nodes of said parent node; wherein a first one of said child nodes is structured to communicate the status information of said first one of said child nodes to said parent node in a corresponding first one of said time slots in said Time Division Multiple Access mode; wherein a different second one of said child nodes is structured to communicate the status information of said different second one of said child nodes to said parent node in a corresponding different second one of said time slots in said Time Division Multiple Access mode; and wherein said parent node is structured to communicate the status information of said child nodes to or toward said network coordinator in a third one of said time slots after said first one and said different second one of said time slots in said Time Division Multiple Access mode.

5. The wireless communication network of claim 1 wherein at least one of said nodes is a parent node; wherein a plurality of said nodes are child nodes of said parent node; wherein a first one of said child nodes is structured to communicate the status information of said first one of said child nodes to said parent node using a first one of said channels in a first one of said time slots in said Time Division Multiple Access mode; wherein a different second one of said child nodes is structured to communicate the status information of said different second one of said child nodes to said parent node using a different second one of said channels in the first one of said time slots in said Time Division Multiple Access mode; and wherein said parent node is structured to communicate the status information of said child nodes to or toward said network coordinator in a different second one of said time slots after said first one of said time slots in said Time Division Multiple Access mode.

6. The wireless communication network of claim 5 wherein said parent node comprises the first one of said channels, the second one of said channels, a first one of said wireless transceivers and a second one of said wireless transceivers; wherein said parent node is further structured to receive the status information of said first one of said child nodes using the first one of said channels and the first one of said transceivers, and to contemporaneously receive the status information of said different second one of said child nodes using the second one of said channels and the second one of said transceivers.

7. The wireless communication network of claim 1 wherein at least one of said nodes is a parent node; wherein a plurality of said nodes are child nodes of said parent node; wherein said first number of channels is a plurality of channels and said first number of wireless transceivers is a plurality of wireless transceivers; wherein the corresponding second number of channels is a second plurality of channels and the corresponding second number of wireless transceivers is a second plurality of wireless transceivers; wherein each of said child nodes is structured to communicate the status information thereof to said parent node using either: the same one of said time slots in said Time Division Multiple Access mode and different ones of said second channels, or different ones of said time slots in said Time Division Multiple Access mode and the same one of said second channels.

8. The wireless communication network of claim 1 wherein said network coordinator is structured to provide a commissioning phase in which said network coordinator builds a spanning tree including a plurality of edges, causes time synchronization among the nodes, calculates said collision-free schedules, and communicates said collision-free schedules; and wherein each of said edges has a child node of said nodes and a parent node of said nodes.

9. The wireless communication network of claim 1 wherein said network coordinator is structured to build a spanning tree including a plurality of edges, a plurality of branches, a plurality of child nodes of said nodes and a plurality of parent nodes of said nodes; wherein each of said branches includes a number of said child nodes; and wherein said network coordinator first calculates one of said collision-free schedules for one of said branches having the largest count of said child nodes.

10. The wireless communication network of claim 1 wherein said network coordinator is structured to build a spanning tree including a plurality of edges, a plurality of branches, a plurality of child nodes of said nodes and a plurality of parent nodes of said nodes; wherein a first plurality of said branches defines a first multi-hop communication path from a first one of said child nodes to one of said parent nodes to or toward said network coordinator; wherein a second plurality of said branches defines a second multi-hop communication path from a different second one of said child nodes to one of said parent nodes to or toward said network coordinator; and wherein said network coordinator first calculates a first plurality of said collision-free schedules for the first multi-hop communication path before said network coordinator calculates a second plurality of said collision-free schedules for the second multi-hop communication path.

11. A data aggregation method for a wireless communication network including a plurality of nodes, said nodes including a network coordinator, a plurality of child nodes and a plurality of parent nodes, said method comprising:

defining a network topology of a plurality of pairs of said child nodes and said parent nodes in said wireless communication network, each of said pairs including one of said child nodes and one of said parent nodes;

at said network coordinator, collecting network topology information from said wireless communication network and assigning a plurality of time slots and a number of channels to said nodes in order to provide a plurality of collision-free schedules for all of said nodes;

for each of said child nodes and said parent nodes, sending a corresponding collision-free schedule from said network coordinator to or toward a corresponding one of said child nodes and said parent nodes;

including, with said corresponding collision-free schedule, a corresponding time slot and a corresponding channel that the corresponding one of said child nodes and said parent nodes employs to send status information to or toward said network coordinator; and for each of said child nodes and said parent nodes, starting at the corresponding time slot, sending said status information to or toward said network coordinator on the corresponding channel.

12. The method of claim 11 further comprising communicating a number of commands from said network coordinator to or toward said nodes in a Carrier Sense Multiple Access mode.

13. The method of claim 11 further comprising building an address tree topology in order that said network coordinator is the root of said address tree topology and said child nodes and said parent nodes are descendants of said network coordinator;
employing a first constraint whereby each of said parent nodes cannot send the status information to or toward said network coordinator until each of said parent nodes receives the status information from all of its child nodes; and
employing a second constraint whereby none of said pairs can send the status information simultaneously over the same one of said channels.

14. The method of claim 13 further comprising employing a third constraint as being a maximum count of said channels;
employing a fourth constraint as being a maximum count of radio transceivers for said wireless communication network; and
employing a fifth constraint as being a maximum count of the radio transceivers for each of said child nodes and said parent nodes.

15. The method of claim 14 further comprising employing a sixth constraint as being a maximum time for the network coordinator to receive all of the status information from said child nodes and said parent nodes.

16. The method of claim 11 further comprising building a spanning tree including a plurality of edges at said network coordinator, each of said edges including one of said child nodes and one of said parent nodes;
synchronizing time at each of the nodes;
calculating said corresponding collision-free schedules at said network coordinator; and
communicating said calculated corresponding collision-free schedules from said network coordinator to or toward said parent nodes and said child nodes.

17. The method of claim 11 further comprising for some of said collision-free schedules, assigning a plurality of said time slots to a number of said child nodes and said parent nodes.

18. The method of claim 11 further comprising for a number of said collision-free schedules and for a number of said time slots, assigning a number of redundant empty time slots.

19. The method of claim 11 further comprising for some of said collision-free schedules, dynamically selecting a plurality of said channels on the basis of communication link qualities.

20. The method of claim 11 further comprising employing a total count of said time slots for said collision-free schedules as being less than or equal to about ten plus a count of said child nodes and said parent nodes divided by a count of said number of channels.

21. The method of claim 11 further comprising employing a count of said plurality of nodes of about 500 to about 1000.

22. The method of claim 11 further comprising predefining a plurality of extra wireless transceivers; and
assigning said extra wireless transceivers to a number of said nodes and, otherwise, employing a single wireless transceiver at each of the others of said nodes.

23. The method of claim 11 further comprising synchronizing time between said network coordinator and said nodes in a Carrier Sense Multiple Access mode.

24. A wireless communication network comprising:
a network coordinator comprising a first number of channels and a second number of wireless transceivers; and
a plurality of nodes, each of said nodes comprising status information, a corresponding second number of channels and a corresponding second number of wireless transceivers,
wherein at least some of said nodes are structured to communicate with said network coordinator through multi-hop communication,
wherein said nodes and said network coordinator are structured to communicate in a Carrier Sense Multiple Access mode,
wherein said network coordinator is structured to command said nodes to exit said Carrier Sense Multiple Access mode and enter a Time Division Multiple Access mode,
wherein each of said nodes is structured to communicate the status information thereof to or toward said network coordinator in said Time Division Multiple Access mode,
wherein said Time Division Multiple Access mode has a plurality of time slots, and
wherein said network coordinator is structured to assign said time slots and said channels to said nodes in order to provide a plurality of collision-free schedules for said nodes in said Time Division Multiple Access mode.

* * * * *